(12) United States Patent
Sharma

(10) Patent No.: US 12,730,713 B2
(45) Date of Patent: Sep. 8, 2026

(54) USING A READ SCRUB COUNTER ASSOCIATED WITH A TIME TAG TO INITIATE A READ SCRUB OPERATION

(71) Applicant: Sandisk Technologies, Inc., Milpitas, CA (US)

(72) Inventor: Varun Sharma, Ghaziabad (IN)

(73) Assignee: Sandisk Technologies, Inc., Milpitas, CA (US)

( * ) Notice: Subject to any disclaimer, the term of this patent is extended or adjusted under 35 U.S.C. 154(b) by 191 days.

(21) Appl. No.: 18/664,659

(22) Filed: May 15, 2024

(65) Prior Publication Data

US 2025/0355766 A1 Nov. 20, 2025

(51) Int. Cl.
*G06F 11/00* (2006.01)
*G06F 11/10* (2006.01)

(52) U.S. Cl.
CPC ........ *G06F 11/106* (2013.01); *G06F 11/1044* (2013.01)

(58) Field of Classification Search
CPC ........................... G06F 11/106; G06F 11/1044
See application file for complete search history.

(56) References Cited

U.S. PATENT DOCUMENTS 8,004,895 B2 * 8/2011 Gonzalez ............ G06F 11/1068 365/185.11
9,552,171 B2 * 1/2017 Huang ............... G11C 16/0483
10,824,365 B2 * 11/2020 Jung ........................ G06F 13/16
11,513,890 B1 * 11/2022 Mekhanik ............. G06F 11/076
11,748,021 B2 * 9/2023 Boehm ............... G06F 11/1076 714/764
2016/0077903 A1 * 3/2016 Reddy ................. G06F 11/0727 714/704
2021/0311827 A1 * 10/2021 Lu ....................... G06F 11/1068

* cited by examiner

*Primary Examiner* — Amine Riad
(74) *Attorney, Agent, or Firm* — DENTONS Durham Jones Pinegar

(57) ABSTRACT

A read scrub management system of a data storage device maintains and updates information associated with one or more Cell Voltage threshold Distribution (CVD) time tags. Each time tag is associated with one or more memory blocks and includes information about operating parameters associated with the memory blocks. Each time tag also includes its own read scrub counter. The read scrub management system increments the read scrub counter associated with a particular time tag each time one or more memory blocks associated with the particular time tag are accessed. When the read scrub counter reaches or exceeds a threshold value, the read scrub management system initiates a read scrub operation on the memory block(s) associated with the particular time tag.

20 Claims, 6 Drawing Sheets

USING A READ SCRUB COUNTER ASSOCIATED WITH A TIME TAG TO INITIATE A READ SCRUB OPERATION

BACKGROUND

When data is read from a non-volatile data storage device, such as a NAND data storage device, a voltage is applied to a particular memory cell from which the data is to be read. If a threshold voltage of the memory cell is higher than the applied voltage, it indicates the memory cell is storing a first value (e.g., a logical zero). If the threshold voltage of the memory cell is lower than the applied voltage, it indicates the memory cell is storing a second value (e.g., a logical one).

However, each time a voltage is applied to the memory cell, the threshold voltages of neighboring memory cells may be impacted. For example, as the voltage is applied to the particular memory cell, the threshold voltage of neighboring, unread memory cells may change, which impacts the accuracy of the stored data. This phenomenon is known as read disturb. If left unchecked, read disturb may eventually cause the data in the memory cells to be unrecoverable or uncorrectable.

To combat read disturb, some non-volatile data storage devices implement a random read scrub operation. When a random read scrub operation is initiated, one or more word lines of a selected memory block are checked for errors. If a failed bit count (FBC) or a bit error rate (BER) of the word lines is above a threshold, the memory block undergoes further analysis to determine whether read parameters of the memory block need to be updated or whether the data stored by the memory block should be relocated.

A non-volatile data storage device typically includes a large number of memory blocks and, at any given time, one or more memory cells of each of the memory blocks may be negatively impacted by read disturb. However, in current solutions, a single memory block is randomly selected for a read scrub operation. As a result, the probability of detecting and correcting memory blocks that have been negatively impacted by read disturbs is relatively low.

Accordingly, it would be beneficial to increase a probability that a memory block that has been impacted by read disturb will be selected for a read scrub operation.

SUMMARY

The present disclosure describes a data storage device, such as a NAND data storage device, having a read scrub management system. The read scrub management system is part of, or is otherwise associated with, a controller of the data storage device. In an example, the read scrub management system updates information associated with one or more Cell Voltage threshold Distribution (CVD) time tags. Each time tag includes information about operating parameters associated with one or more memory blocks including, but not limited to, read threshold values, write threshold values, the physical addresses of memory blocks associated with the time tag, bit error rates (BERs) of the memory blocks associated with the time tag and so on.

Each time tag is associated with one or more memory blocks. Additionally, each memory of the memory blocks that are associated with a particular time tag share or are associated with the same or similar operating parameters. In an example, each time tag is also associated with its own read scrub counter. The read scrub management system is tasked with incrementing the read scrub counter each time one or more memory blocks that are associated with a particular time tag is accessed. When the read scrub counter reaches or exceeds a threshold value, the read scrub management system initiates a read scrub operation on the memory block (or memory blocks) associated with the time tag.

Because the data storage device supports multiple time tags and each time tag has its own respective read scrub counter, a probability of detecting and/or correcting read failures caused by read disturb increases when compared with current solutions.

Accordingly, examples of the present disclosure describe a method that includes receiving a read request from a host device and identifying one or more memory blocks of one or more memory dies of a non-volatile storage device associated with the read request. A time tag associated with the identified one or more memory blocks is identified. In an example, the time tag is associated with a read scrub counter. The read scrub counter associated with the time tag is incremented and a determination is made as to whether the read scrub counter associated with the time tag exceeds a threshold value. Based, at least in part, on determining the read scrub counter associated with the time tag exceeds the threshold value, a read scrub operation is initiated on the one or more memory blocks associated with the time tag.

Other examples describe a non-volatile data storage device that includes a controller and one or more memory dies. In an example, the controller is operable to receive a read request and identify a memory block of at least one memory die of the one or more memory dies associated with the read request. The controller is also operable to identify a particular time tag from a plurality of time tags associated with the memory block. In an example, each time tag of the plurality of time tags is associated with a respective read scrub counter. The controller increments the read scrub counter associated with the particular time tag and determines whether the read scrub counter associated with the particular time tag exceeds a threshold value. The controller also initiates a read scrub operation on the memory block associated with the particular time tag based, at least in part, on a determination that the read scrub counter associated with the particular time tag exceeds the threshold value.

Still other examples describe a non-volatile data storage device that includes control means and data storage means divided into a plurality of memory blocks. The non-volatile data storage device also includes read parameter tracking means. In an example, the read parameter tracking means includes a counting means for counting a number of times a subset of memory blocks from the plurality of memory blocks have been accessed. The non-volatile data storage device also includes read scrub operation means. In an example, the read scrub operation means initiates a read scrub operation on a memory block of the plurality of memory blocks associated with the read parameter tracking means.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

Figure 1:
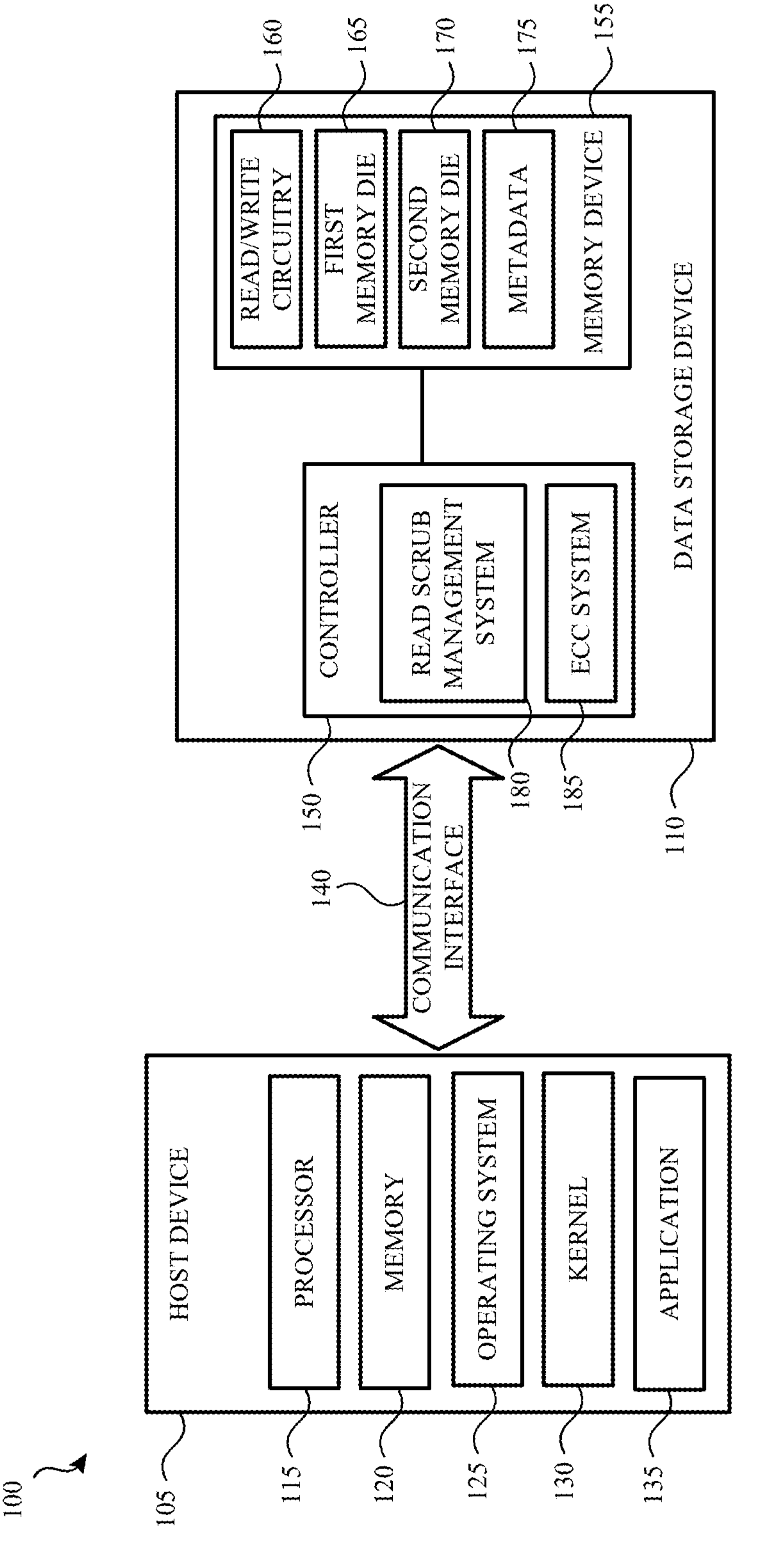
FIG. 1 is a block diagram of a system that includes a host device and a data storage device according to an example.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. The following detailed description is therefore not to be taken in a limiting sense, and the scope of the present disclosure is defined by the appended claims and their equivalents.

A non-volatile data storage device, such as a NAND data storage device, includes a number of memory dies and each memory die is divided into a number of different memory blocks. Some of the memory blocks are single-level cell (SLC) memory blocks while other memory blocks are triple-level cell (TLC) memory blocks.

When data is read from the non-volatile data storage device, a voltage is applied to a particular memory cell of a memory block from which the data is to be read. If a threshold voltage of the memory cell is higher than the applied voltage, it indicates the memory cell is storing a logical zero. If the threshold voltage of the memory cell is lower than the applied voltage, it indicates the memory cell is storing a logical one.

However, as previously explained, each time a voltage is applied to the memory cell, a read disturb may impact the threshold voltages of neighboring memory cells. If left unchecked, read disturbs may eventually cause the data in the affected memory cells to be unrecoverable or uncorrectable.

To combat read disturb, some non-volatile data storage devices implement a random read scrub operation. When a random read scrub operation is initiated, one or more word lines of a selected memory block are checked for errors. If a failed bit count (FBC) or a bit error rate (BER) of the one or more word lines is above a threshold, the memory block undergoes further analysis to determine whether read parameters of the memory block need to be updated or whether the data stored by the memory block should be relocated.

In current implementations, a non-volatile data storage device typically includes a large number of memory blocks and, at any given time, one or more memory cells of each of the memory blocks may be negatively impacted by read disturb. However, due to the large number of memory blocks and because a single memory block is randomly selected for a read scrub operation, current implementations of initiating the read scrub operations cannot adequately detect and/or correct read disturb errors.

To address the above, the present application describes a read scrub management system for a data storage device. In an example, the read scrub management system is part of, or is otherwise associated with, a controller of the data storage device. The read scrub management system updates information associated with one or more Cell Voltage threshold Distribution (CVD) time tags. Each time tag includes information about operating parameters associated with one or more memory blocks of the data storage device.

For example, the data storage device can have up to X number of time tags and each time tag is associated with one or more groups of memory blocks. The memory blocks that are associated with a particular time tag share, or are associated with, the same or similar operating parameters. In an example, the operating parameters include, but are not limited to, read threshold values, write threshold values, reference voltages, a physical address of a memory block (or memory blocks), a bit error rate (BER) of the memory block(s) associated with the time tag and so on In an example, each time tag also includes, or is associated with, its own read scrub counter. For example a first time tag includes a first read scrub counter, a second time tag includes a second read scrub counter and so on. The read scrub management system is tasked with incrementing the read scrub counter each time one or more memory blocks that are associated with a particular time tag is accessed. When the read scrub counter reaches or exceeds a threshold, the read scrub management system initiates a read scrub operation on the memory block (or memory blocks) associated with the time tag.

Because the data storage device supports multiple time tags and each time tag has its own respective read scrub counter, a probability of detecting and/or correcting read failures caused by read disturb increases when compared with current solutions. Additionally, time tags are typically updated after a read scrub operation occurs, so the addition of a read scrub counter to a time tag is a logical fit.

Accordingly, many technical benefits may be realized including, but not limited to, increasing the frequency at which read scrub operations are performed thereby increasing the probability of detecting and correcting errors caused by read disturb, increasing the probability that read disturb errors are detected and corrected by targeting a group of memory blocks having the same operating parameters for read scrub operations instead of a random memory block and increasing the reliability of the data storage device.

These benefits, along with other examples, will be shown and described in greater detail with respect to FIG. 1-FIG. 6.

FIG. 1 is a block diagram of a system 100 that includes a host device 105 and a data storage device 110 according to an example. In an example, the host device 105 includes a processor 115 and a memory 120 (e.g., main memory). The memory 120 includes or is otherwise associated with an operating system 125, a kernel 130 and/or an application 135.

The processor 115 can execute various instructions, such as, for example, instructions from the operating system 125 and/or the application 135. The processor 115 includes circuitry such as a microcontroller, a Digital Signal Processor (DSP), an Application-Specific Integrated Circuit (ASIC), a Field Programmable Gate Array (FPGA), hardwired logic, analog circuitry and/or various combinations thereof. In an example, the processor 115 includes a System on a Chip (SoC).

In an example, the memory 120 is used by the host device 105 to store data used, or otherwise executed by, the processor 115. Data stored in the memory 120 includes instructions provided by the data storage device 110 via a communication interface 140. The data stored in the memory 120 also includes data used to execute instructions from the operating system 125 and/or one or more applications 135. The memory 120 may be a single memory or may include multiple memories, such as, for example one or more non-volatile memories, one or more volatile memories, or a combination thereof.

In an example, the operating system 125 creates a virtual address space for the application 135 and/or other processes executed by the processor 115. The virtual address space maps to locations in the memory 120. The operating system 125 also includes or is otherwise associated with a kernel 130. The kernel 130 includes instructions for managing various resources of the host device 105 (e.g., memory allocation), handling read and write requests and so on.

The communication interface 140 communicatively couples the host device 105 and the data storage device 110. The communication interface 140 may be a Serial Advanced Technology Attachment (SATA), a PCI express (PCIe) bus, a Small Computer System Interface (SCSI), a Serial Attached SCSI (SAS), Ethernet, Fibre Channel, or Wi-Fi. As such, the host device 105 and the data storage device 110 need not be physically co-located and may communicate over a network such as a Local Area Network (LAN) or a Wide Area Network (WAN), such as the internet. In addition, the host device 105 may interface with the data storage device 110 using a logical interface specification such as Non-Volatile Memory express (NVMe) or Advanced Host Controller Interface (AHCI).

The data storage device 110 includes a controller 150 and a memory device 155. In an example, the controller 150 is communicatively coupled to the memory device 155. The memory device 155 includes one or more memory dies (e.g., a first memory die 165 and a second memory die 170). Although memory dies are specifically mentioned, the memory device 155 may include any non-volatile memory device, storage device, storage elements or storage medium including NAND flash memory cells and/or NOR flash memory cells.

The memory cells can take the form of solid-state (e.g., flash) memory cells and can be one-time programmable, few-time programmable, or many-time programmable. Additionally, the memory cells may be single-level cells (SLCs), multi-level cells (MLCs), triple-level cells (TLCs), quad-level cells (QLCs), penta-level cells (PLCs), and/or use any other memory technologies. In one example, the memory cells are arranged in a two-dimensional configuration. In another example, the memory cells are arranged in a three-dimensional configuration.

In an example, the data storage device 110 is attached to or embedded within the host device 105. In another example, the data storage device 110 is implemented as an external device or a portable device that can be communicatively or selectively coupled to, and removed from, the host device 105. In yet another example, the data storage device 110 is a component (e.g., a solid-state drive (SSD)) of a network accessible data storage system, a network-attached storage system, a cloud data storage system, or the like.

As indicated above, the memory device 155 of the data storage device 110 includes a first memory die 165 and a second memory die 170. Although two memory dies are shown, the memory device 155 may include any number of memory dies (e.g., one memory die, two memory dies, eight memory dies, or another number of memory dies).

The memory device 155 also includes support circuitry. In an example, the support circuitry includes read/write circuitry 160. The read/write circuitry 160 supports the operation of the memory dies of the memory device 155. Although the read/write circuitry 160 is depicted as a single component, the read/write circuitry 160 may be divided into separate components, such as, for example, read circuitry and write circuitry. The read/write circuitry 160 may be external to the memory dies of the memory device 155. In another example, one or more of the memory dies may include corresponding read/write circuitry 160 that is operable to read data from and/or write data to storage elements within one individual memory die independent of other read and/or write operations on any of the other memory dies.

In an example, one or more of the first memory die 165 and the second memory die 170 include one or more memory blocks. In an example, each memory block includes one or more memory cells. A block of memory cells is the smallest number of memory cells that are physically erasable together. In an example and for increased parallelism, each of the blocks may be operated or organized in larger blocks or metablocks. For example, one block from different planes of memory cells may be logically linked together to form a metablock.

Figure 2A:
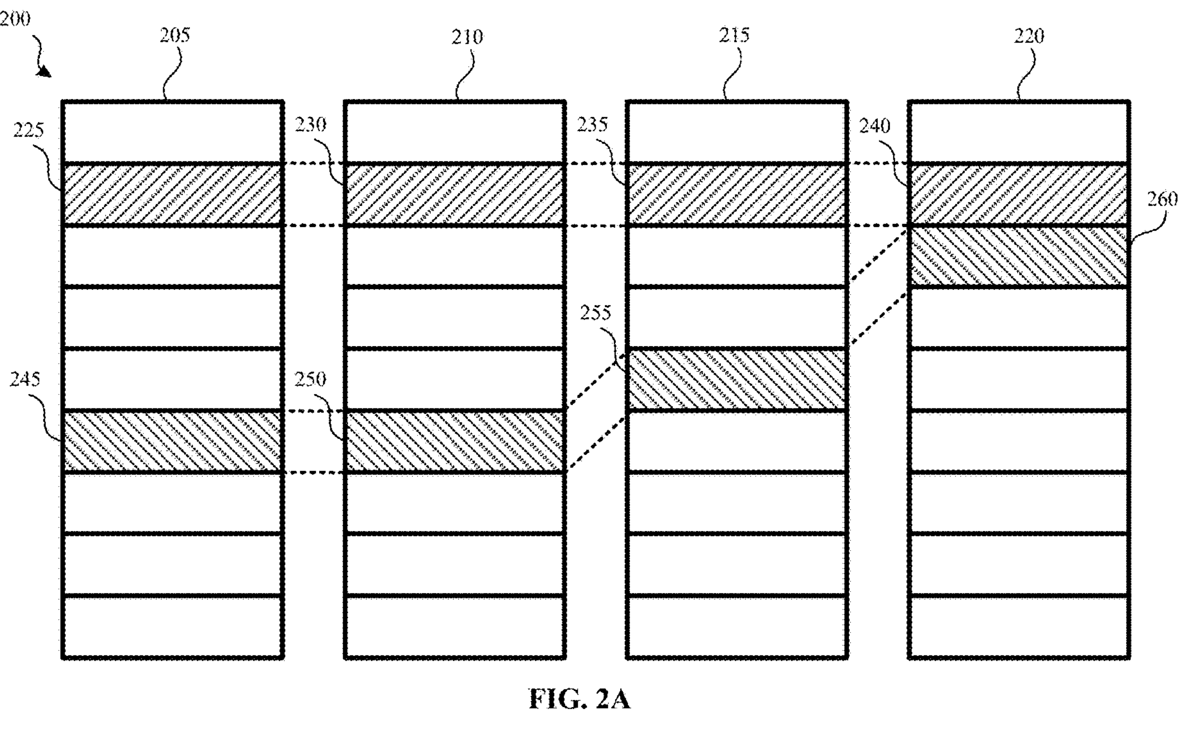
FIG. 2A illustrates how a memory device includes a number of memory blocks according to an example.

For example and referring to FIG. 2A, FIG. 2A illustrates how a memory device 200 includes a number of memory blocks according to an example. For example, the memory device 200 (e.g., a storage element, a memory die, a non-volatile memory device) includes four planes or sub-arrays (e.g., a first plane 205, a second plane 210, a third plane 215, and a fourth plane 220). In an example, the planes are integrated on a single memory die. In another example, the planes are provided on two different memory dies (e.g., two planes on each memory die). In yet another example, the planes are provided on four separate memory dies. Although four planes are shown and described, the memory device 200 may have any number of planes and/or memory dies.

In an example, each plane is divided into memory blocks consisting memory cells. As shown in FIG. 2A, the rectangles represent a memory block, such as memory block 225, memory block 230, memory block 235 and memory block 240. There may be dozens or hundreds of memory blocks in each plane of the memory device 200. In an example, each memory block is a unit of erase and is sometimes referred to as an erase block. For example, memory block 225, memory block 230, memory block 235 and memory block 240 include a minimum number of memory cells that are erased together.

In addition, various memory blocks are logically linked or grouped together (e.g., using a table in or otherwise accessible by the controller 150 (FIG. 1)) to form a metablock. A metablock is written to, read from and/or erased as a single unit. For example, memory block 225, memory block 230, memory block 235 and memory block 240 form a first metablock while memory block 245, memory block 250, memory block 255 and memory block 260 form a second metablock. The memory blocks used to form a metablock need not be restricted to the same relative locations within their respective planes.

In an example, each memory block is associated with a time tag. For example, memory block 225 and memory block 230 are associated with a first time tag and memory block 240, memory block 245, memory block 250, memory block 255 and memory block 260 are associated with a second time tag. Although a specific number of memory blocks and time tags are mentioned, these are for example purposes only.

Figure 2B:
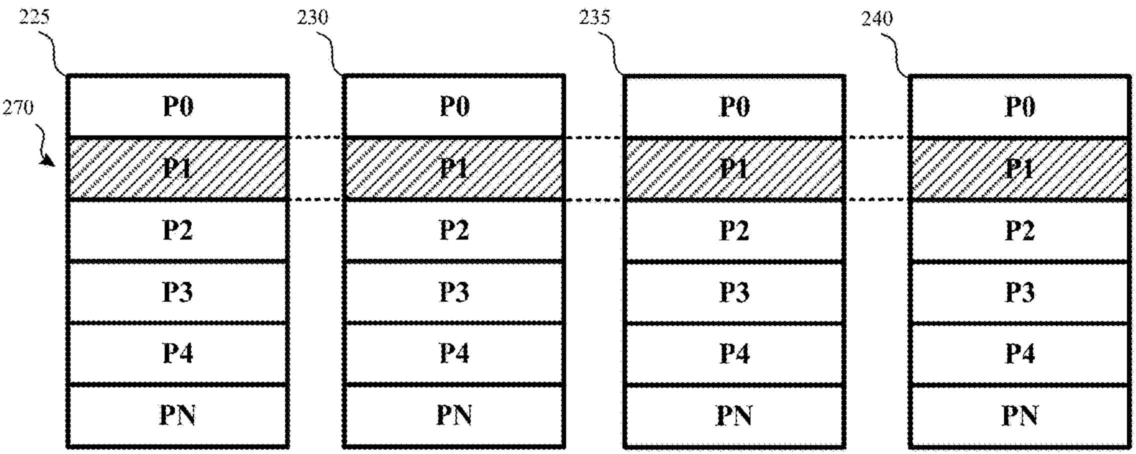
FIG. 2B illustrates how a memory block includes one or more pages according to an example.

In an example, each memory block is divided, for operational purposes, into pages of memory cells. For example and referring to FIG. 2B, FIG. 2B illustrates how a memory block includes one or more pages according to an example. For example, the memory cells of memory block 225, memory block 230, memory block 235 and memory block 240 are divided into N different pages (shown as P0-PN). Although a specific number of pages are shown in FIG. 2B, a memory block may have any number of pages of memory cells within each memory block.

In an example, a page is a unit of data programming within the memory block. Each page includes the minimum amount of data that can be programmed at one time. The minimum unit of data that can be read at one time may be less than a page. A metapage 270 is illustrated in FIG. 2B as being formed of one physical page from memory block 225, memory block 230, memory block 235 and memory block 240. In the example, shown, the metapage 270 includes page P1 in each of the four memory blocks. However, the pages of the metapage 270 need not have the same relative position within each of the memory blocks. A metapage 270 may be the maximum unit of programming within a memory block.

The memory blocks disclosed in FIG. 2A-FIG. 2B are referred to herein as physical memory blocks because they relate to groups of physical memory cells as discussed above. As used herein, a logical memory block is a virtual unit of address space defined to have the same size as a physical memory block. Each logical memory block includes a range of logical memory block addresses (LBAs) that are associated with data received from a host. The LBAs are then mapped to one or more physical memory blocks in the data storage device 110 where the data is physically stored.

As indicated above, each memory block may include any number of memory cells. The design, size, and organization of a memory block may depend on the architecture, design, and application desired for each memory die. In an example, the memory block includes a contiguous set of memory cells that share a plurality of word lines and bit lines.

Figure 2C:
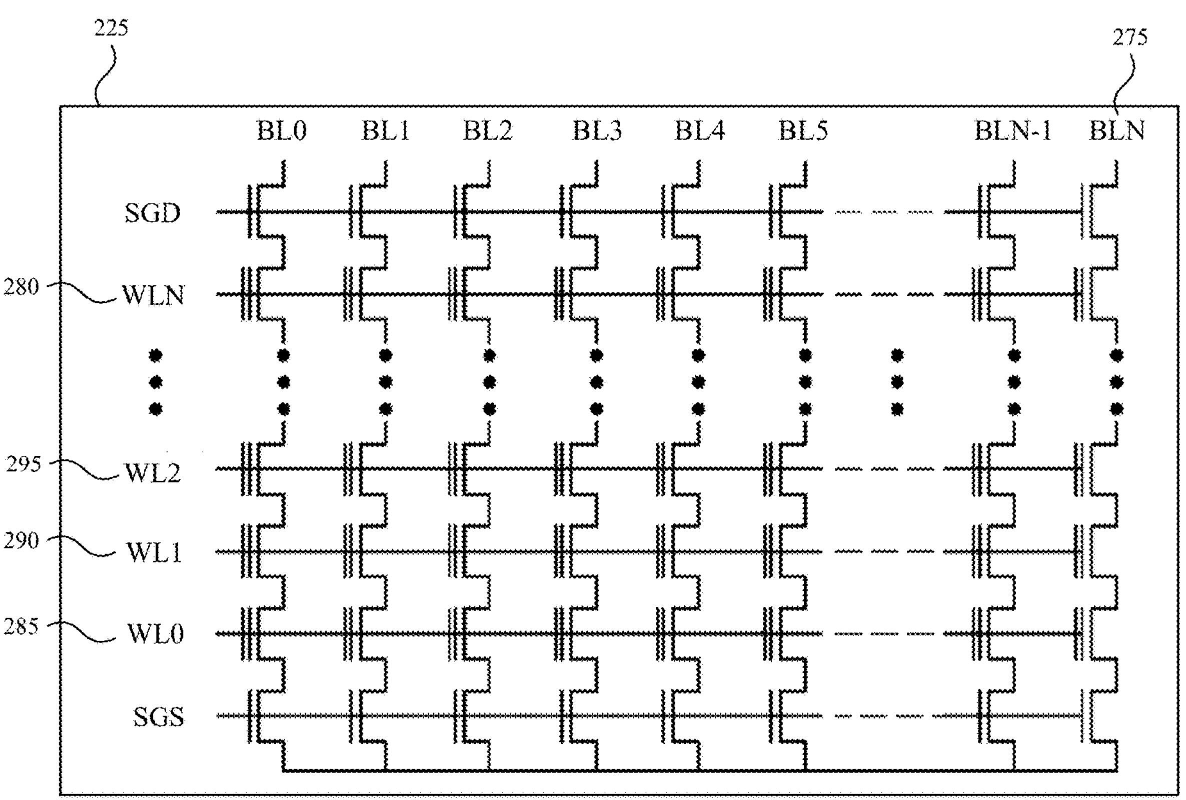
FIG. 2C illustrates how a memory block includes a number of bit lines and word lines according to an example.

FIG. 2C illustrates how a memory block includes a number of bit lines 275 and word lines 280 according to an example. For example and as shown in FIG. 2C, the memory block 225 includes bit lines BL0-BLN (collectively bit lines 275), where N is a total number of bit lines. Additionally, the memory block 225 includes word lines WL0-WLN (collectively word lines 280), where N is a total number of word lines. In an example, multiple memory blocks can share the same bit line.

A word line 280 may function as a single-level-cell (SLC) word line, a multi-level-cell (MLC) word line, a tri-level-cell (TLC) word line, a quad-level cell (QLC) word line, a penta-level cell (PLC) word line and so on. Additionally, each memory cell may be programmable to a state (e.g., a threshold voltage in a flash configuration or a resistive state in a resistive memory configuration) that indicates one or more values.

In the example shown in FIG. 2C, four memory cells are connected in series to form a NAND string. Although four memory cells are depicted, any number of memory cells (e.g., 16, 32, 64, 128, 256 or any other number or memory cells) may be used. One terminal of the NAND string is connected to a corresponding bit line via a drain select gate (connected to select gate drain line SGD) and another terminal of the NAND string is connected to a source line via a source select gate (connected to select gate source line SGS). Additionally, although eight bit lines are shown in FIG. 2C, any number of bit lines may be used.

Referring back to FIG. 1, as previously described, the data storage device 110 also include a controller 150. Although a single controller 150 is shown and described, the data storage device 110 can include multiple controllers. In such an example, a first controller executes a first operation or set of operations and the second controller executes a second operation or set of operations.

The controller 150 is communicatively coupled to the memory device 155 via a bus, an interface or other communication circuitry. In an example, the communication circuitry includes one or more channels to enable the controller 150 to communicate with the first memory die 165 and/or the second memory die 170 of the memory device 155. In another example, the communication circuitry includes multiple distinct channels which enables the controller 150 to communicate with the first memory die 165 independently and/or in parallel with the second memory die 170 of the memory device 155.

The controller 150 receives data and/or instructions from the host device 105. The controller 150 also sends data to the host device 105. For example, the controller 150 sends data to and/or receives data from the host device 105 via the communication interface 140. The controller 150 also sends data and/or commands to, and/or receive data from, the memory device 155.

The controller 150 sends data and a corresponding write command to the memory device 155 to cause the memory device 155 to store data at a specified address of the memory device 155. In an example, the write command specifies a physical address of a portion of the memory device 155. The controller 150 also sends data and/or commands associated with one or more background scanning operations, garbage collection operations, and/or wear leveling operations.

The controller 150 also sends one or more read commands to the memory device 155. In an example, the read command specifies the physical address of a portion of the memory device 155 at which the data is stored. The controller 150 also tracks the number of program/erase cycles or other programming operations that have been performed on or by the memory device and/or the memory dies of the memory device 155.

The controller 150 also includes, or is otherwise associated with, a read scrub management system 180. In an example, the read scrub management system 180 is a packaged functional hardware unit designed for use with other components/systems. In another example, the read scrub management system 180 is a portion of a program code (e.g., software or firmware) executable by a processor or processing circuitry. In yet another example, the read scrub management system 180 is a self-contained hardware and/or software component that interfaces with other components and/or systems. Although the read scrub management system 180 is shown as being part of the controller 150, the read scrub management system 180 may be separate from the controller 150.

In an example, the read scrub management system 180 is operable, along with the controller 150, to track information included with, or stored by, a time tag. In an example, a time tag is associated with a group or set of memory blocks. For example, a time tag is associated with twenty memory blocks. In another example, a time tag is associated with fifty memory blocks. Although a specific number of memory blocks are mentioned, a time tag can be associated with any number of memory blocks. Additionally, the memory blocks associated with a time tag may be in the same area or contiguous region of a memory die or different areas or regions of a memory die.

In an example, the time tag includes information that identifies the physical blocks it covers, such as a range or ranges of physical memory block addresses. The time tag also includes a time stamp to indicate when the current read parameters and/or write parameters (e.g., read/write voltage thresholds) of the time tag was set. In other examples, the time tag includes program parameters (e.g., the amplitude of the initial programming pulse for each state and step size) and/or information on operating conditions (such as temperature) at the time of programming. The time tag also includes information corresponding to a BER associated with one or more of the memory blocks associated with the time tag.

In addition the above, the time tag also includes a read scrub counter. The read scrub counter is incremented each time information stored by the time tag is accessed or fetched and/or each time a memory block associated with the time tag is accessed. The read scrub management system 180 also determines when/whether the read scrub counter is equivalent to, or exceeds a threshold. When the read scrub management system 180 determines the read scrub counter is equivalent to or exceeds the threshold, the read scrub management system 180 initiates a read scrub operation on one or more of the memory blocks associated with the time tag.

For example, when the controller 150 receives a read request from the host device 105, the controller 150 and/or the read scrub management system 180 determines or identifies, based on information associated with the read request, one or more memory blocks that are associated with the read request. In an example, the memory blocks are SLC memory blocks. In another example, the memory blocks are TLC memory blocks, QLC memory blocks or other types of memory blocks.

Additionally, the controller 150 and/or the read scrub management system 180 determine a time tag associated with the identified memory blocks and/or the read request. When the time tag is identified, the read scrub management system 180 accesses the information in the time tag and returns it to the controller 150.

For example, the read scrub management system 180 accesses the read threshold voltage (or other information) contained in the time tag and provides that information to the controller 150. The controller 150 then initiates the read operation using the read threshold of the current time tag corresponding to region or set of memory blocks (or word lines) that store the requested data.

In addition, the read scrub management system 180 also increments the read scrub counter associated with the time tag. When the read scrub counter has been incremented, the read scrub management system 180 compares the read scrub counter to a threshold value. In an example, the threshold value is a random number. In another example, the threshold value is a predetermined number. In yet another example, the threshold value is a random number added to a predetermined number.

In some examples, the random number is based, at least in part, on a number of time tags being used by the data storage device 110. For example, the number of time tags being used by the data storage device can vary depending on an operating state of the data storage device 110. For example, while operating in a first state, the data storage device includes and/or uses N time tags. However, while operating in a second state, the data storage device 110 includes and/or uses M time tags. However, regardless of the number of time tags that are in use, each time tag includes its own read scrub counter. In other examples, some time tags include read scrub counters while other time tags do not include read scrub counters.

If the read scrub management system 180 determines that the read scrub counter is not equivalent to the threshold value, the read scrub management system 180 continues monitoring the received read commands. However, if the read scrub management system 180 determines that the read scrub counter is equivalent to or exceeds the threshold value, the read scrub management system 180 initiates a read scrub operation.

For example, the read scrub management system 180 uses the read threshold to read one or more pages associated with one or more word lines associated with one or more memory blocks that are identified as being associated with the time tag. The read scrub management system 180 also identifies the BER of the word lines and compares the BER to a BER threshold.

If the BER of the selected word lines is below the BER threshold, the read scrub management system 180 generates a new threshold value (or keeps the same threshold value) and resets the read scrub counter associated with the time tag.

However, if the read scrub management system 180 determines that the BER of the selected word lines is above the BER threshold, the read scrub management system 180 determines whether to change or update one or more operating parameters stored in the time tag and/or whether to relocate the data stored in the memory block.

For example, if the read scrub management system determines that the BER on the word line is above the BER threshold, the read scrub management system 180 shifts a read reference voltage that is used to read the data to try to optimize the read reference voltage. In an example, the amount of change to the read reference voltage is based on a threshold amount of error that is below the maximum amount of error that an error correction code (ECC) system 185 can handle. In an example, the maximum amount of error depends on the type and/or strength of ECC algorithm used by the ECC system 185. This process may be repeated a number of times.

If the read and/or ECC operations are successful, the information in the time tag is updated. For example, the time tag can store the updated read reference voltages for the memory blocks along with other information (e.g., a time at which the reference voltages were updated). The read scrub management system 180 also resets the read scrub counter associated with the time tag and the above-described processes are repeated.

In an example, the time tag information is stored as metadata 175. Although the metadata 175 is shown as being stored in the memory device 155, the metadata 175 may be stored by the controller 150 and/or the read scrub management system 180. In other examples, the metadata 175 includes additional information associated with the memory device 155. This information may include, but is not limited to, a number of program/erase (P/E) cycles performed on one or more memory blocks of the memory dies, an operating state of the memory device 155 or other information.

Figure 3:
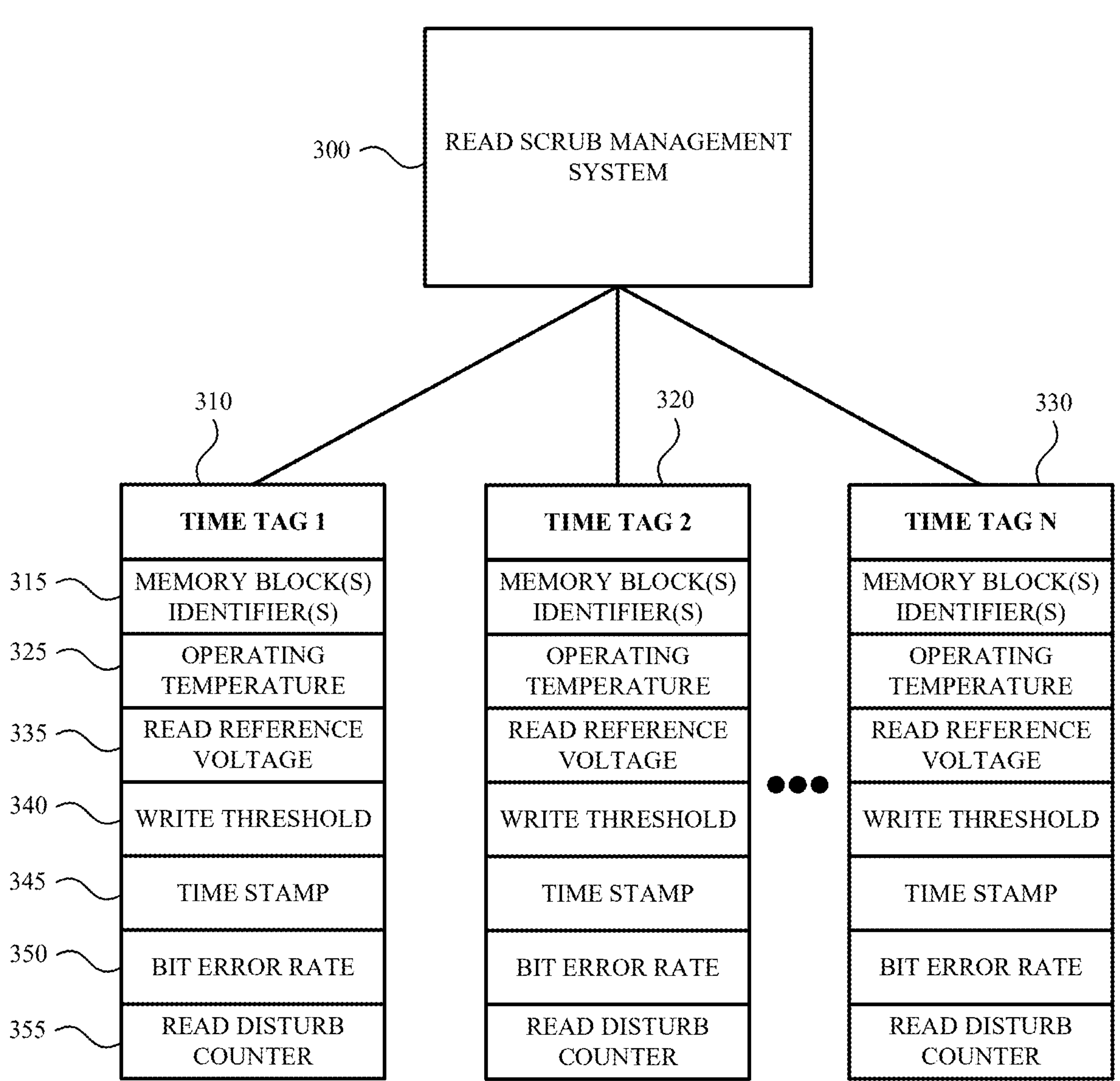
FIG. 3 illustrates how a read scrub management system interacts with a number of different time tags according to an example.

FIG. 3 illustrates how a read scrub management system 300 interacts with a number of different time tags according to an example. In an example, the read scrub management system 300 is similar to the read scrub management system 180 shown and described with respect to FIG. 1.

As shown in FIG. 3, the read scrub management system 300 interacts, updates and/or monitors N different time tags—Time Tag 1 310, Time Tag 2 320 and Time Tag N 330. In an example, the number of time tags that the read scrub management system 300 interacts with is dynamic. For example, the number of time tags is based on a current operating state (e.g., an amount of available/consumed space) of a data storage device. In another example, the number of time tags that the read scrub management system 300 interacts with is static.

In an example, each time tag is associated with type of memory block. For example, Time Tag 1 310 is associated with a first type of memory block (e.g., SLC memory blocks) and Time Tag 2 320 and Time Tag N 330 are associated with a second type of memory block (e.g., TLC memory blocks).

Additionally, each time tag includes information about the one or more memory blocks it is associated with. For example, the information included or associated with each time tag includes memory block identifiers 315 that includes the logical and/or physical address of memory blocks associated with a particular time tag; operating temperature 325 information that indicates a temperature at which data in the memory block associated with the particular time tag was written and/or accessed; read reference voltage 335 information that indicates a voltage that is needed to read the data from the memory blocks associated with the particular time tag; write threshold 340 information that indicates a voltage that is required to write data to the memory blocks associated with the particular time tag; time stamp 345 information that indicates a time that data in each of the memory blocks associated with the particular time tag was accessed and/or written; bit error rate (BER) 350 information that indicates a BER of the memory blocks associated with the particular time tag; and a read disturb counter 355 that indicates a number of time the memory blocks associated with the particular time tag have been accessed.

As previously indicated, the read scrub management system 300 increments the read disturb counter 355 each time a particular time tag is accessed and/or each time one or more memory blocks associated with the particular time tag have been accessed. The read scrub management system 300 also determines whether to initiate a read scrub operation on the one or more memory blocks associated with the particular time tag when the read scrub management system 300 determines the read scrub counter 355 is above a threshold value.

Figure 4:
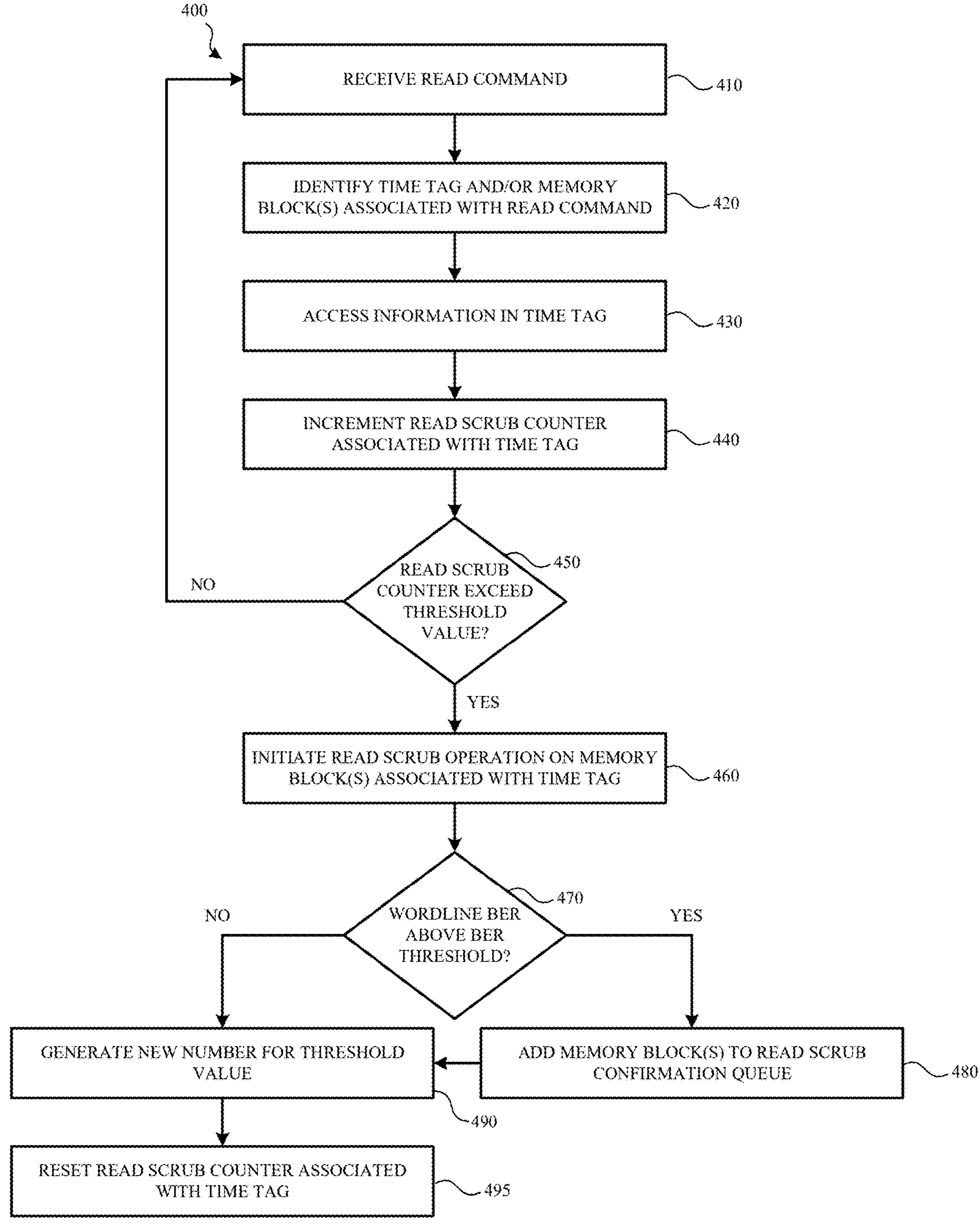
FIG. 4 illustrates a method for determining whether to initiate a read scrub operation on memory blocks associated with a time tag according to an example.

FIG. 4 illustrates a method 400 for determining whether to initiate a read scrub operation on memory blocks associated with a time tag according to an example. In an example, the method 400 is executed by a controller and/or a read scrub management system of a data storage device such as, for example, the controller 150 and/or the read scrub management system 180 shown and described with respect to FIG. 1.

The method 400 begins when the controller receives (410) a read command. In an example, the read command is received from a host device. In another example, the read command is an internal read command. For example, the read command is part of a garbage collection operation or a relocation operation.

Based on receiving the read command, the read scrub management system identifies (420) or determines a time tag and/or one or more memory blocks that are associated with the read command. For example, when the read command is received, the read scrub management system and/or the controller determines one or more read command parameters associated with the read command and determines, based on the read command parameters, which memory blocks include the information that is requested by the read command. The read scrub management system also identifies the time tags associated with the identified memory blocks.

When the time tags and/or the memory blocks are identified, the read scrub management system accesses (430) the information stored in the time tag. In an example, each time tag is also associated with its own unique read scrub counter. As such, when the information in the time tag is accessed, the read scrub management system increments (440) the read scrub counter associated with the time tag.

When the read scrub counter has been incremented, the read scrub management system determines (450) whether the read scrub counter exceeds a threshold value. In an example, the threshold value is a random number. In another example, the threshold value is a predetermined or static number. In another example, the threshold value is a random number added to the predetermined number. In yet another example, the threshold value is specific to a particular time tag and/or is based on an operating state of the data storage device.

If the read scrub management system determines (450) that the read scrub counter associated with the time tag does not exceed the threshold value, the method 400 is repeated. However, if the read scrub management system determines (450) that the read scrub counter associated with the time tag meets or exceeds the threshold value, the read scrub management system initiates (460) a read scrub operation on one or more memory blocks associated with the time tag.

In an example, the read scrub operation that is initiated includes selecting one or more word lines and/or pages from a memory block associated with the time tag and reading the information in the word lines and/or pages using the parameters specified in the time tag. The read scrub management system then determines (470) whether a BER of the data that was read from the word lines/pages meets or exceeds a BER threshold.

If the read scrub management system determines (470) the BER of the data does not meet or exceed the BER threshold, the read scrub management system generates (490) a new number (e.g., a random number) for the threshold value and resets (495) the read scrub counter associated with the time tag. However, if the read scrub management system determines (470) the BER of the data meets or exceeds the BER threshold, one or more memory blocks from which the data was read is added (480) to a read scrub confirmation queue.

In an example, when one or more memory blocks are added to the read scrub confirmation queue, the read scrub management system determines whether to update one or more parameters of the time tag associated with the memory blocks and/or whether to relocate the data. The read scrub management system also generates (490) a new number (e.g., a random number) for the threshold value and resets (495) the read scrub counter associated with the time tag.

Figures 5, 6:
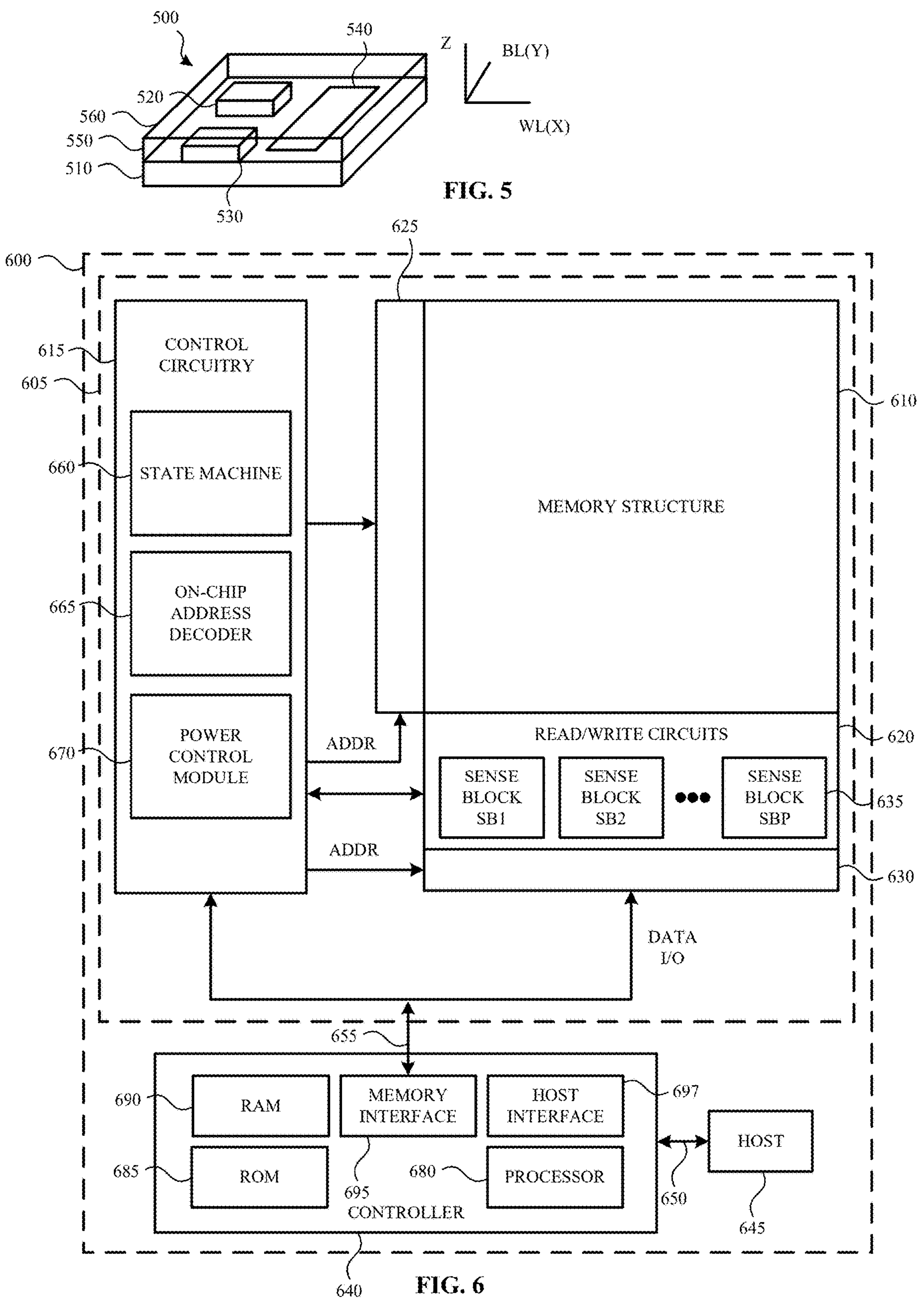
FIG. 5 is a perspective view of a storage device that includes three-dimensional (3D) stacked non-volatile memory according to an example.
FIG. 6 is a block diagram of a storage device according to an example.

FIG. 5-FIG. 6 describe example storage devices that may be used with or otherwise implement the various features described herein. For example, the storage devices shown and described with respect to FIG. 5-FIG. 6 may include various systems and components that are similar to the systems and components shown and described with respect to FIG. 1. For example, the controller 622 shown and described with respect to FIG. 6 may be similar to the controller 150 of FIG. 1. Likewise, the memory dies 608 may be similar to the first memory die 165 and/or the second memory die 170 of FIG. 1.

FIG. 5 is a perspective view of a storage device 500 that includes three-dimensional (3D) stacked non-volatile memory according to an example. In this example, the storage device 500 includes a substrate 510. Blocks of memory cells are included on or above the substrate 510. The blocks include a first block (BLK0 520) and a second block (BLK1 530). Each block is formed of memory cells (e.g., non-volatile memory elements). The substrate 510 also includes a peripheral area 540 having support circuits that are used by the first block and the second block.

The substrate 510 also carries circuits under the blocks, along with one or more lower metal layers which are patterned in conductive paths to carry signals from the circuits. In an example, the blocks are formed in an intermediate region 550 of the storage device 500. The storage device also includes an upper region 560. The upper region 560 includes one or more upper metal layers that are patterned in conductive paths to carry signals from the circuits. Each block of memory cells includes a stacked area of memory cells. In an example, alternating levels of the stack represent word lines. While two blocks are depicted, additional blocks may be used and extend in the x-direction and/or the y-direction.

In an example, a length of a plane of the substrate 510 in the x-direction represents a direction in which signal paths for word lines or control gate lines extend (e.g., a word line or drain-end select gate (SGD) line direction) and the width of the plane of the substrate 510 in the y-direction represents a direction in which signal paths for bit lines extend (e.g., a bit line direction). The z-direction represents a height of the storage device 500.

FIG. 6 is a functional block diagram of a storage device 600 according to an example. In an example, the storage device 600 is similar to the 3D stacked non-volatile storage device 500 shown and described with respect to FIG. 5. In an example, the components depicted in FIG. 6 are electrical circuits. In an example, the storage device 600 includes one or more memory dies 605. Each memory die 605 includes a three-dimensional memory structure 610 of memory cells (e.g., a 3D array of memory cells), control circuitry 615, and read/write circuits 620. In another example, a two-dimensional array of memory cells may be used. The memory structure 610 is addressable by word lines using a first decoder 625 (e.g., a row decoder) and by bit lines using a second decoder 630 (e.g., a column decoder). The read/write circuits 620 may also include multiple sense blocks 635 including SB1, SB2, . . . , SBp (e.g., sensing circuitry) which allow pages of the memory cells to be read or programmed in parallel. The sense blocks 635 may include bit line drivers.

In an example, a controller 640 is included in the same storage device 600 as the one or more memory dies 605. In another example, the controller 640 is formed on a die that is bonded to a memory die 605, in which case each memory die 605 may have its own controller 640. In yet another example, a controller die controls all of the memory dies 605. Although a single controller 640 is shown, the storage device 600 can include multiple controllers with each controller responsible for different operations described herein.

Commands and data are transferred between a host 645 and the controller 640 using a data bus 650. Additionally, commands and data are transferred between the controller 640 and one or more of the memory dies 605 by way of lines 655. In one example, the memory die 605 includes a set of input and/or output (I/O) pins that connect to lines 655.

The memory structure 610 also includes one or more arrays of memory cells. The memory cells are arranged in a three-dimensional array or a two-dimensional array. The memory structure 610 includes any type of non-volatile memory that is formed on one or more physical levels of arrays of memory cells having an active area disposed above a silicon substrate. The memory structure 610 may be in a non-volatile memory device having circuitry associated with the operation of the memory cells, whether the associated circuitry is above or within the substrate.

The control circuitry 615 works in conjunction with the read/write circuits 620 to perform memory operations (e.g., erase, program, read, and others) on the memory structure 610. The control circuitry 615 may include registers, ROM fuses, and other devices for storing default values such as base voltages and other parameters.

The control circuitry 615 also includes a state machine 660, an on-chip address decoder 665 and a power control module. The state machine 660 provides chip-level control of various memory operations, such as selecting a memory block for programming. The state machine 660 is programmable by software. In another example, the state machine 660 does not use software and is completely implemented in hardware (e.g., electrical circuits).

The on-chip address decoder 665 provides an address interface between addresses used by host 645 and/or the controller 640 to a hardware address used by the first decoder 625 and the second decoder 630. The power control module 670 controls power and voltages that are supplied to the word lines and bit lines during memory operations. The power control module 670 may include drivers for word line layers in a 3D configuration, select transistors (e.g., SGS and SGD transistors) and source lines. The power control module 670 may include one or more charge pumps for creating voltages.

The control circuitry 615, the state machine 660, the on-chip address decoder 665, the first decoder 625, the second decoder 630, the power control module 670, the sense blocks 635, the read/write circuits 620, and/or the controller 640 may be considered one or more control circuits and/or a managing circuit that perform some or all of the operations described herein.

In an example, the controller 640, is an electrical circuit that may be on-chip or off-chip. Additionally, the controller 640 may include one or more processors 680, ROM 685, RAM 690, memory interface 695, and host interface 697, all of which may be interconnected. In an example, the one or more processors 680 is one example of a control circuit. Other examples can use state machines or other custom circuits designed to perform one or more functions. Devices such as ROM 685 and RAM 690 may include code such as a set of instructions. One or more of the processors 680 may be operable to execute the set of instructions to provide some or all of the functionality described herein.

Alternatively or additionally, one or more of the processors 680 may access code from a memory device in the memory structure 610, such as a reserved area of memory cells connected to one or more word lines. The memory interface 695, in communication with ROM 685, RAM 690, and one or more of the processors 680, may be an electrical circuit that provides an electrical interface between the controller 640 and the memory die 605. For example, the memory interface 695 may change the format or timing of signals, provide a buffer, isolate from surges, latch I/O, and so forth.

The one or more processors 680 may issue commands to control circuitry 615, or any other component of memory die 605, using the memory interface 695. The host interface 697, in communication with the ROM 685, the RAM 690, and the one or more processors 680, may be an electrical circuit that provides an electrical interface between the controller 640 and the host 645. For example, the host interface 697 may change the format or timing of signals, provide a buffer, isolate from surges, latch I/O, and so on. Commands and data from the host 645 are received by the controller 640 by way of the host interface 697. Data sent to the host 645 may be transmitted using the data bus 650.

Multiple memory elements in the memory structure 610 may be configured so that they are connected in series or so that each element is individually accessible. By way of a non-limiting example, flash memory devices in a NAND configuration (e.g., NAND flash memory) typically contain memory elements connected in series. A NAND string is an example of a set of series-connected memory cells and select gate transistors.

A NAND flash memory array may also be configured so that the array includes multiple NAND strings. In an example, a NAND string includes multiple memory cells sharing a single bit line and are accessed as a group. Alternatively, memory elements may be configured so that each memory element is individually accessible (e.g., a NOR memory array). The NAND and NOR memory configurations are examples and memory cells may have other configurations.

The memory cells may be arranged in the single memory device level in an ordered array, such as in a plurality of rows and/or columns. However, the memory elements may be arrayed in non-regular or non-orthogonal configurations, or in structures not considered arrays.

In an example, a 3D memory structure may be vertically arranged as a stack of multiple 2D memory device levels. As another non-limiting example, a 3D memory array may be arranged as multiple vertical columns (e.g., columns extending substantially perpendicular to the major surface of the substrate, such as in the y direction) with each column having multiple memory cells. The vertical columns may be arranged in a two-dimensional arrangement of memory cells, with memory cells on multiple vertically stacked memory planes. Other configurations of memory elements in three dimensions can also constitute a 3D memory array.

In another example, in a 3D NAND memory array, the memory elements may be coupled together to form vertical NAND strings that traverse across multiple horizontal memory device levels. Other 3D configurations can be envisioned wherein some NAND strings contain memory elements in a single memory level while other strings contain memory elements which span through multiple memory levels. 3D memory arrays may also be designed in a NOR configuration and in a ReRAM configuration.

One of ordinary skill in the art will recognize that the technology described herein is not limited to a single specific memory structure, but covers many relevant memory structures within the spirit and scope of the technology as described herein and as understood by one of ordinary skill in the art.

In accordance with the above, examples of the present disclosure describe a method, comprising: receiving a read request from a host device; identifying one or more memory blocks of one or more memory dies of a non-volatile storage device associated with the read request; identifying a time tag associated with the identified one or more memory blocks, the time tag being associated with a read scrub counter; incrementing the read scrub counter associated with the time tag; determining whether the read scrub counter associated with the time tag exceeds a threshold value; and initiating a read scrub operation on the one or more memory blocks associated with the time tag based, at least in part, on determining the read scrub counter associated with the time tag exceeds the threshold value. In an example, the one or more memory blocks are multi-level cell (MLC) memory blocks. In an example, the read scrub counter associated with the time tag is incremented in response to retrieval of a read parameter associated with the time tag. In an example, initiating the read scrub operation comprises: selecting at least one word line associated with the one or more memory blocks; determining a bit error rate (BER) associated with the at least one word line; and determining whether the BER associated with the at least one word line exceeds a BER threshold. In an example, the threshold value is a random number. In an example, the method also includes generating a new random number for the threshold value based, at least in part, on determining the BER associated with the at least one word line is below the BER threshold; and resetting the read scrub counter associated with the time tag. In an example, the method also includes adding the one or more memory blocks to a read scrub confirmation queue; and determining whether to relocate data stored in the one or more memory blocks. In an example, the method also includes generating a new random number for the threshold value; and resetting the read scrub counter associated with the time tag. In an example, the threshold value is based, at least in part, on a number of available time tags available for the non-volatile storage device.

Examples also describe a non-volatile data storage device, comprising: a controller; and one or more memory dies associated with the controller, wherein the controller is operable to: receive a read request; identify a memory block of at least one memory die of the one or more memory dies associated with the read request; identify a particular time tag from a plurality of time tags associated with the memory block, each time tag of the plurality of time tags being associated with a respective read scrub counter; increment the read scrub counter associated with the particular time tag; determine whether the read scrub counter associated with the particular time tag exceeds a threshold value; and initiate a read scrub operation on the memory block associated with the particular time tag based, at least in part, on a determination that the read scrub counter associated with the particular time tag exceeds the threshold value. In an example, the controller is further operable to increment the read scrub counter in response to retrieving a read parameter associated with the time tag. In an example, initiating the read scrub operation comprises: selecting at least one word line associated with the memory block; determining a bit error rate (BER) associated with the at least one word line; and determining whether the BER associated with the at least one word line exceeds a BER threshold. In an example, the threshold value is a random number. In an example, the controller is further operable to: generate a new random number for the threshold value based, at least in part, on determining the BER associated with the at least one word line is below the BER threshold; and reset the read scrub counter associated with the time tag. In an example, the controller is further operable to: add the memory block to a read scrub confirmation queue; and determine whether to relocate data stored in the memory block. In an example, the controller is further operable to: generate a new random number for the threshold value; and reset the read scrub counter associated with the time tag.

Examples also describe a non-volatile data storage device, comprising: control means; data storage means divided into a plurality of memory blocks; read parameter tracking means, the read parameter tracking means including a counting means for counting a number of times a subset of memory blocks from the plurality of memory blocks have been accessed; and read scrub operation means, the read scrub operation means initiating a read scrub operation on a memory block of the plurality of memory blocks associated with the read parameter tracking means. In an example, the read scrub operation means initiates the read scrub operation on the memory block based, at least in part, on a determination that a value tracked by the counting means exceeds a threshold. In an example, the control means increments the counting means in response to retrieving a read parameter from the read parameter tracking means. In an example, a number of read parameter tracking means and associated counting means varies based, at least in part, on an operating state of the non-volatile data storage device.

The description and illustration of one or more aspects provided in the present disclosure are not intended to limit or restrict the scope of the disclosure in any way. The aspects, examples, and details provided in this disclosure are considered sufficient to convey possession and enable others to make and use the best mode of claimed disclosure.

The claimed disclosure should not be construed as being limited to any aspect, example, or detail provided in this disclosure. Regardless of whether shown and described in combination or separately, the various features (both structural and methodological) are intended to be selectively rearranged, included or omitted to produce an embodiment with a particular set of features. Having been provided with the description and illustration of the present disclosure, one skilled in the art may envision variations, modifications, and alternate aspects falling within the spirit of the broader aspects of the general inventive concept embodied in this disclosure that do not depart from the broader scope of the claimed disclosure.

Aspects of the present disclosure have been described above with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

References to an element herein using a designation such as "first," "second," and so forth does not generally limit the quantity or order of those elements. Rather, these designations may be used as a method of distinguishing between two or more elements or instances of an element. Thus, reference to first and second elements does not mean that only two elements may be used or that the first element precedes the second element. Additionally, unless otherwise stated, a set of elements may include one or more elements.

Terminology in the form of "at least one of A, B, or C" or "A, B, C, or any combination thereof" used in the description or the claims means "A or B or C or any combination of these elements." For example, this terminology may include A, or B, or C, or A and B, or A and C, or A and B and C, or 2A, or 2B, or 2C, or 2A and B, and so on. As an additional example, "at least one of: A, B, or C" is intended to cover A, B, C, A-B, A-C, B-C, and A-B-C, as well as multiples of the same members. Likewise, "at least one of: A, B, and C" is intended to cover A, B, C, A-B, A-C, B-C, and A-B-C, as well as multiples of the same members.

Similarly, as used herein, a phrase referring to a list of items linked with "and/or" refers to any combination of the items. As an example, "A and/or B" is intended to cover A alone, B alone, or A and B together. As another example, "A, B and/or C" is intended to cover A alone, B alone, C alone, A and B together, A and C together, B and C together, or A, B, and C together.

What is claimed is:

1. A method, comprising:

receiving a read request from a host device;

identifying one or more memory blocks of one or more memory dies of a non-volatile storage device associated with the read request;

identifying a time tag associated with the identified one or more memory blocks, the time tag being associated with one or more operating parameters and a read scrub counter;

incrementing the read scrub counter associated with the time tag;

determining whether the read scrub counter associated with the time tag exceeds a threshold value; and initiating a read scrub operation on the one or more memory blocks associated with the time tag based, at least in part, on determining the read scrub counter associated with the time tag exceeds the threshold value.

2. The method of claim 1, wherein the one or more memory blocks are multi-level cell (MLC) memory blocks.

3. The method of claim 1, wherein the read scrub counter associated with the time tag is incremented in response to retrieval of a read parameter associated with the time tag.

4. The method of claim 1, wherein initiating the read scrub operation comprises:

selecting at least one word line associated with the one or more memory blocks;

determining a bit error rate (BER) associated with the at least one word line; and determining whether the BER associated with the at least one word line exceeds a BER threshold.

5. The method of claim 4, wherein the threshold value is a random number.

6. The method of claim 5, further comprising:

generating a new random number for the threshold value based, at least in part, on determining the BER associated with the at least one word line is below the BER threshold; and resetting the read scrub counter associated with the time tag.

7. The method of claim 5, further comprising:

adding the one or more memory blocks to a read scrub confirmation queue; and determining whether to relocate data stored in the one or more memory blocks.

8. The method of claim 7, further comprising:

generating a new random number for the threshold value; and resetting the read scrub counter associated with the time tag.

9. The method of claim 1, wherein the threshold value is based, at least in part, on a number of available time tags available for the non-volatile storage device.

10. A non-volatile data storage device, comprising:
a controller; and
one or more memory dies associated with the controller, wherein the controller is operable to:
receive a read request;
identify a memory block of at least one memory die of the one or more memory dies associated with the read request;
identify a particular time tag from a plurality of time tags associated with the memory block, each time tag of the plurality of time tags being associated with one or more operating parameters and a respective read scrub counter;
increment the read scrub counter associated with the particular time tag;
determine whether the read scrub counter associated with the particular time tag exceeds a threshold value; and
initiate a read scrub operation on the memory block associated with the particular time tag based, at least in part, on a determination that the read scrub counter associated with the particular time tag exceeds the threshold value.

11. The non-volatile data storage device of claim 10, wherein the controller is further operable to increment the read scrub counter in response to retrieving a read parameter associated with the time tag.

12. The non-volatile data storage device of claim 10, wherein initiating the read scrub operation comprises:
selecting at least one word line associated with the memory block;
determining a bit error rate (BER) associated with the at least one word line; and
determining whether the BER associated with the at least one word line exceeds a BER threshold.

13. The non-volatile data storage device of claim 12, wherein the threshold value is a random number.

14. The non-volatile data storage device of claim 13, wherein the controller is further operable to:
generate a new random number for the threshold value based, at least in part, on determining the BER associated with the at least one word line is below the BER threshold; and
reset the read scrub counter associated with the time tag.

15. The non-volatile data storage device of claim 13, wherein the controller is further operable to:
add the memory block to a read scrub confirmation queue; and
determine whether to relocate data stored in the memory block.

16. The non-volatile data storage device of claim 15, wherein the controller is further operable to:
generate a new random number for the threshold value; and
reset the read scrub counter associated with the time tag.

17. A non-volatile data storage device, comprising:
control means;
data storage means divided into a plurality of memory blocks;
read parameter tracking means, the read parameter tracking means being associated with one or more operating parameters and including a counting means for counting a number of times a subset of memory blocks from the plurality of memory blocks have been accessed; and
read scrub operation means, the read scrub operation means initiating a read scrub operation on a memory block of the plurality of memory blocks associated with the read parameter tracking means.

18. The non-volatile data storage device of claim 17, wherein the read scrub operation means initiates the read scrub operation on the memory block based, at least in part, on a determination that a value tracked by the counting means exceeds a threshold.

19. The non-volatile data storage device of claim 17, wherein the control means increments the counting means in response to retrieving a read parameter from the read parameter tracking means.

20. The non-volatile data storage device of claim 17, wherein a number of read parameter tracking means and associated counting means varies based, at least in part, on an operating state of the non-volatile data storage device.

* * * * *